(12) United States Patent
Casey

(10) Patent No.: US 10,132,083 B1
(45) Date of Patent: Nov. 20, 2018

(54) SYSTEMS FOR COLLECTING RAINWATER AND RECYCLING GREY WATER

(71) Applicant: Daniel P. Casey, Seattle, WA (US)

(72) Inventor: Daniel P. Casey, Seattle, WA (US)

( * ) Notice: Subject to any disclaimer, the term of this patent is extended or adjusted under 35 U.S.C. 154(b) by 379 days.

(21) Appl. No.: 14/926,971

(22) Filed: Oct. 29, 2015

Related U.S. Application Data

(63) Continuation-in-part of application No. 14/386,766, filed as application No. PCT/US2013/033028 on Mar. 19, 2013, now Pat. No. 9,803,879, which is a continuation-in-part of application No. 13/503,326, filed on Apr. 20, 2012, now Pat. No. 8,742,938, and a continuation-in-part of application No. 13/424,045, filed on Mar. 19, 2012, now Pat. No. 8,979,622, said application No. 14/386,766 is a continuation-in-part of application No. 13/424,045, filed on Mar. 19, 2012, now Pat. No. 8,979,622, which is a continuation-in-part of application No. 12/551,214, filed on Aug. 31, 2009, now abandoned.

(60) Provisional application No. 62/136,000, filed on Mar. 20, 2015, provisional application No. 62/122,742, filed on Oct. 29, 2014.

(51) Int. Cl.
*E04D 13/08* (2006.01)
*C02F 1/00* (2006.01)

(52) U.S. Cl.
CPC ............ *E04D 13/08* (2013.01); *C02F 1/003* (2013.01); *E04D 2013/082* (2013.01); *E04D 2013/086* (2013.01); *E04D 2013/0813* (2013.01); *E04D 2013/0853* (2013.01); *E04D 2013/0873* (2013.01); *E04D 2013/0893* (2013.01)

(58) Field of Classification Search
CPC ................................ C02F 1/003; E04D 13/08
See application file for complete search history.

(56) References Cited

U.S. PATENT DOCUMENTS

| | | |
|---|---|---|
| 3,434,133 A | 3/1969 | Collum |
| 3,821,512 A | 6/1974 | Stanford |
| 4,181,253 A | 1/1980 | Barlow |
| 4,228,006 A | 10/1980 | Hanna |
| 4,333,489 A | 6/1982 | Magill |
| 4,417,667 A | 11/1983 | Grant |
| 4,417,687 A | 11/1983 | Grant |
| 4,623,878 A | 11/1986 | Schoenwetter |
| 4,710,756 A | 12/1987 | Thornburg et al. |

(Continued)

FOREIGN PATENT DOCUMENTS

| | | |
|---|---|---|
| EP | 2385319 A2 | 11/2011 |
| WO | 1994/026352 A1 | 11/1994 |
| WO | 2005/035910 A1 | 4/2005 |

*Primary Examiner* — Peter Keyworth

(57) ABSTRACT

Systems for water collection and recycling are described herein. A downspout having a downspout groove is vertically disposed on an exterior wall. Electrical wiring that is operatively connected to at least one electrical power generator is disposed along the downspout groove. The downspout and electrical power generator are supported by downspout brackets. The downspout is fluidly connected to a gutter and an outdoor water storage tank for collecting rain water. A water pump moves grey water from a shower tub drainage pipeline to a water path switch valve. A control switch directs the water path switch valve to divert the grey water to a toilet storage tank, an outdoor water storage tank, or a washing machine water tank.

9 Claims, 16 Drawing Sheets

(56) References Cited

U.S. PATENT DOCUMENTS

| | | |
|---|---|---|
| 4,993,970 A | 2/1991 | Littrell |
| 5,117,122 A | 5/1992 | Hogarth et al. |
| 5,139,464 A | 8/1992 | Lehnert |
| 5,348,078 A | 9/1994 | Dushane et al. |
| 5,364,304 A | 11/1994 | Hampton |
| 5,443,420 A | 8/1995 | Kim et al. |
| 5,458,311 A | 10/1995 | Holbrook |
| 5,519,382 A | 5/1996 | Pope et al. |
| 5,530,435 A | 6/1996 | Toms et al. |
| 5,736,674 A | 4/1998 | Gretz |
| 5,959,246 A | 9/1999 | Gretz |
| 6,053,809 A | 4/2000 | Arceneaux |
| 6,072,397 A | 6/2000 | Ostrowski |
| 6,114,967 A | 9/2000 | Yousif |
| 6,120,262 A | 9/2000 | McDonough et al. |
| 6,160,487 A | 12/2000 | DeLuca |
| 6,181,251 B1 | 1/2001 | Kelly |
| 6,537,146 B1 | 3/2003 | Haynes |
| 6,630,800 B2 | 10/2003 | Weng |
| 7,034,702 B2 | 4/2006 | Thomas et al. |
| 7,045,706 B1 | 5/2006 | Lincoln, III et al. |
| 7,336,165 B2 | 2/2008 | Fuchs |
| 7,522,063 B2 | 4/2009 | Ehlers |
| 7,656,308 B2 | 2/2010 | Atkins |
| 7,715,441 B2 | 5/2010 | Binder |
| 7,982,434 B2 | 7/2011 | Kimball et al. |
| 8,558,110 B1 | 10/2013 | Shotey |
| 8,742,938 B2 | 6/2014 | Casey |
| 8,979,622 B2 | 3/2015 | Casey |
| 2001/0055947 A1 | 12/2001 | McCabe |
| 2004/0159713 A1 | 8/2004 | Schmidt et al. |
| 2005/0056581 A1 | 3/2005 | Arguello |
| 2006/0048525 A1 | 3/2006 | Cook |
| 2006/0065510 A1 | 3/2006 | Kiko |
| 2006/0190739 A1 | 8/2006 | Soffer |
| 2006/0286918 A1 | 12/2006 | Vargas |
| 2007/0195526 A1 | 8/2007 | Dowling et al. |
| 2007/0202794 A1 | 8/2007 | Antill |
| 2008/0178526 A1 | 7/2008 | Browne et al. |
| 2008/0190739 A1 | 8/2008 | Soffer |
| 2008/0258675 A1 | 10/2008 | Caldwell et al. |
| 2008/0258875 A1 | 10/2008 | Caldwell et al. |
| 2009/0095339 A1* | 4/2009 | Nightingale ............ E04D 13/00 |
| | | 136/244 |
| 2009/0149123 A1 | 6/2009 | Blagg |
| 2009/0195349 A1 | 8/2009 | Frader-Thompson et al. |
| 2009/0224423 A1 | 9/2009 | Vigorito et al. |
| 2010/0226100 A1 | 9/2010 | Johnson et al. |
| 2011/0053487 A1 | 3/2011 | Casey |
| 2012/0199220 A1 | 8/2012 | Knepp et al. |
| 2014/0299555 A1 | 10/2014 | Green |
| 2014/0326331 A1 | 11/2014 | Mimone |

\* cited by examiner

SYSTEMS FOR COLLECTING RAINWATER AND RECYCLING GREY WATER

CROSS REFERENCE

This application is a non-provisional and claims benefit of U.S. Provisional Patent Application No. 62/122,742, filed Oct. 29, 2014, and U.S. Provisional Patent Application No. 62/136,000, filed on Mar. 20, 2015, the specification(s) of which is/are incorporated herein in their entirety by reference.

This application is a continuation-in-part and claims benefit of U.S. patent application Ser. No. 14/386,766 filed Sep. 19, 2014, which is a 371 of PCT/US13/33028 filed on Mar. 19, 2013, which is a continuation-in-part of U.S. patent application Ser. No. 13/503,326 filed on Apr. 20, 2012, now U.S. Pat. No. 8,742,938, and U.S. patent application Ser. No. 13/424,045 filed on Mar. 19, 2012, now U.S. Pat. No. 8,979,622, which is a continuation-in-part of U.S. patent application Ser. No. 12/551,214 filed on Aug. 31, 2009, the specification(s) of which is/are incorporated herein in their entirety by reference.

Further, U.S. patent application Ser. No. 14/386,766 filed Sep. 19, 2014 is a continuation-in-part of U.S. patent application Ser. No. 13/424,045 filed on Mar. 19, 2012, now U.S. Pat. No. 8,979,622, which is a continuation-in-part of U.S. patent application Ser. No. 12/551,214 filed on Aug. 31, 2009, the specification(s) of which is/are incorporated herein in their entirety by reference.

FIELD OF THE INVENTION

The present invention relates to water conservation systems, in particular, to downspout systems and water collection and recycling systems.

BACKGROUND OF THE INVENTION

Fresh, sanitary, and clean water is a vital resource for all living creatures. Water overuse and record droughts have led to a water shortage crisis that has forced some governments to impose water rationing. One solution to ameliorate this problem is to minimize the use of fresh water by collecting rainwater and recycling grey water. Grey water may be defined as water that has been used in washing processes, such as showering, laundry and dishes. Black water, or sewage water, is water that contains urine and fecal matter, i.e. water that has been used in flushing toilets. Grey water can be recycled, whereas black water must undergo a waste water treatment process. However, grey water is deemed non-potable and can only be used for watering lawns and gardens. Harvested rainwater is another source of recycled water that may be used for watering lawns and gardens.

Typically, people wash their clothes and undergarments together in fresh water, thereby soiling the fresh water. It is arguable that the clothing may be washed in grey water. Moreover, people are using fresh water in toilets, which contaminates the fresh water with urine and fecal matter. Hence, it would be more sensible to use grey water in toilets. Therefore, there is a need for systems that can recycle grey water for uses other than watering lawns and gardens.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

According to one embodiment, the present invention features a downspout system for transporting rain water and protecting electrical wiring. The system may comprise a downspout, a plurality of downspout brackets, at least one electrical conduit, and a conduit bracket for each electrical conduit.

According to another embodiment, the present invention features a water recycling system. The system may comprise a water pump operatively connected to a shower tub drainage pipeline, a water path switch valve fluidly connected to the water pump via a valve pipeline, a toilet storage tank fluidly connected to the water path switch valve via an toilet input pipeline, an outdoor water storage tank fluidly connected to the water path switch valve via a first outdoor input pipeline, a washing machine water storage tank connected to the water path switch valve via a washing machine input pipeline, a water filter fluidly connected to a washing machine drainage pipeline, and a control switch operatively connected to the water path switch valve.

According to a further embodiment, the present invention features a water collection and recycling system. The system may comprise a downspout vertically disposed on an exterior wall of a building, a plurality of downspout brackets for mounting the downspout to the exterior wall, at least one electrical conduit for routing the electrical wiring through the exterior wall and into an interior location of the building, a conduit bracket for each electrical conduit, a first water pump operatively connected to a shower tub drainage pipeline, a water path switch valve fluidly connected to the first water pump via a valve pipeline, a toilet storage tank fluidly connected to the water path switch valve via an toilet input pipeline, the outdoor water storage tank fluidly connected to the water path switch valve via a first outdoor input pipeline, a second water pump operative connected to an output pipeline of the outdoor water storage tank for moving water out of the outdoor water storage tank, a washing machine water storage tank connected to the water path switch valve via a washing machine input pipeline, a first water filter fluidly connected to a washing machine drainage pipeline and the outdoor water storage tank fluidly connected to the first water filter via a second outdoor input pipeline, and a control switch operatively connected to the water path switch valve.

DESCRIPTION OF PREFERRED EMBODIMENTS

Figure 1:
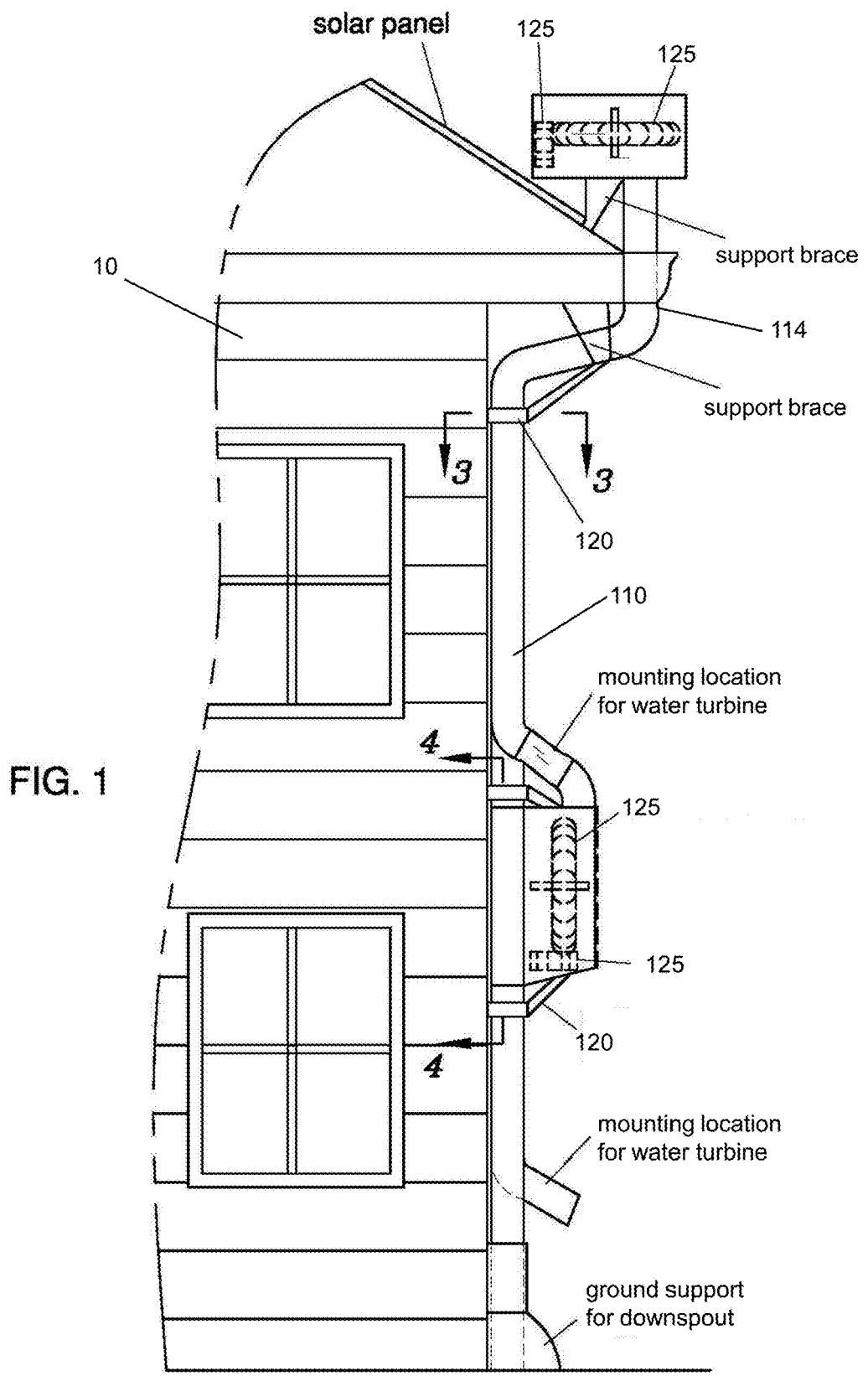
FIG. 1 shows an exemplary embodiment of a downspout system of the present invention.

Following is a list of elements corresponding to a particular element referred to herein:
- 10 building
- 100 downspout system
- 105 exterior wall of the building
- 107 interior location of the building
- 110 downspout
- 112 hollow channel
- 114 downspout inlet end
- 116 downspout outlet end
- 118 downspout groove
- 119 exterior surface of downspout
- 120 downspout bracket
- 125 turbine
- 130 electrical conduit
- 140 conduit bracket
- 200 water recycling system
- 210 first water pump
- 220 second water pump
- 230 water path switch valve
- 240 toilet storage tank
- 250 outdoor water storage tank
- 260 washing machine water storage tank
- 270 first water filter
- 280 second water filter
- 290 control switch Referring now to FIG. 1-19, the present invention features a downspout system (100) for transporting rain water and protecting electrical wiring. According to one embodiment, the system (100) may comprise a downspout (110), a plurality of downspout brackets (120), at least one electrical conduit (130), and a conduit bracket (140) for each electrical conduit (130).

In one embodiment, the downspout (110) may comprise a hollow channel (112), a downspout inlet end (114) fluidly connecting a gutter to the hollow channel (112), a downspout outlet end (116), and a downspout groove (118) disposed lengthwise along an exterior surface (119) of the downspout (110). In another embodiment, the downspout (110) is vertically disposed on an exterior wall (105) of a building (10), such as a house. Preferably, the downspout groove (118) is directly facing the exterior wall (105), i.e. the downspout groove is biased towards the exterior wall.

According to one embodiment, the plurality of downspout brackets (120) is used for mounting the downspout (110) to the exterior wall (105). The downspout brackets may be horizontally disposed with respect to the downspout. Each downspout bracket may have two opposing ends that are directly attached to the exterior wall, while the downspout bracket body interfacingly clamps around the exterior surface of the downspout.

According to another embodiment, the electrical conduit (130) can route the electrical wiring through the exterior wall (105) and into an interior location (107) of the building (10). The electrical conduit (130) and the electrical wiring disposed therein may be supported by the conduit bracket (140). Preferably, the conduit bracket (140) is mounted to the exterior wall (105) such that the conduit bracket (140) is disposed between the exterior wall (105) and the downspout (110).

In some embodiments, the conduit bracket (140) is relatively smaller in size than the downspout bracket (120). For example, the conduit bracket (140) is horizontally mounted to the exterior wall at the same height as the downspout bracket, and is directly aligned with the downspout bracket. The conduit bracket may be positioned between the ends of the downspout bracket such that conduit bracket (140) is hidden from view by the downspout bracket (120).

In some embodiments, the electrical wiring is disposed along the downspout groove (118). For example, the electrical wiring is disposed on the exterior surface and parallel to the downspout groove. According to one embodiment, the electrical wiring may be disposed inside the electrical conduit, in which the conduit lies along the downspout groove. Preferably, the downspout groove is sufficiently sized such that the electrical wiring or conduit can be completely hidden within the downspout groove.

In other embodiments, the electrical wiring is operatively connected to at least one electrical power generator. For instance, the electrical power generator is a turbine (125) such as a wind turbine, a water turbine, or a combination thereof. As another example, the electrical power generator is a solar panel. The solar panel is preferably mounted on a roof of the building. In some embodiments, the turbine (125) is mounted adjacent to the downspout (110), while being structurally supported by at least the downspout brackets (120). The turbine may also be mounted on the roof adjacent to but without blocking any solar panel from sunlight.

In further embodiments, the downspout outlet end (116) is fluidly connected to a water storage tank (250). A water pump (220) may be operative connected to the water storage tank (250) for pumping water out of the water storage tank (250). The water pump (220) may be supplied with electricity from the electrical power generator via the electrical wiring.

According to another embodiment, the present invention features a water recycling system (200). The system (200) may comprise a water pump (210) operatively connected to a shower tub drainage pipeline, a water path switch valve (230) fluidly connected to the water pump (210) via a valve pipeline, a toilet storage tank (240) fluidly connected to the water path switch valve (230) via an toilet input pipeline, an outdoor water storage tank (250) fluidly connected to the water path switch valve (230) via a first outdoor input pipeline, a washing machine water storage tank (260) connected to the water path switch valve (230) via a washing machine input pipeline, a water filter (270) fluidly connected to a washing machine drainage pipeline, and a control switch (290) operatively connected to the water path switch valve (230).

In one embodiment, the water pump (210) moves grey water from a shower tub drainage pipeline to the water path switch valve (230). The control switch (290) directs the water path switch valve (230) to divert the grey water to the toilet storage tank (240), the outdoor water storage tank (250), or the washing machine water tank (260). Examples of the water path switch valve may include, but is not limited to, a solenoid valve, or a 4-way valve having 1 input port and 3 output ports. Any of the storage tanks may contain a disinfecting mechanism such as UV-light or activated carbon filters.

In some embodiments, when the grey water is diverted to the washing machine water tank (260) and after use of the grey water by a washing machine, the grey water is filtered by the water filter (270) prior to being sent to the outdoor water storage tank (250), which may be fluidly connected to the water filter (270) via a second outdoor input pipeline.

In preferred embodiments, the control switch (290) is wireless to wirelessly control the water path switch valve. The control switch (290) may further have a gauge for measuring a tank level of the toilet storage tank (240).

According to a further embodiment, the present invention features a water collection and recycling system. The system may comprise a downspout (110) vertically disposed on an exterior wall (105) of a building (10), a plurality of downspout brackets (120) for mounting the downspout (110) to the exterior wall (105), at least one electrical conduit (130) for routing the electrical wiring through the exterior wall (105) and into an interior location (107) of the building (10), a conduit bracket (140) for each electrical conduit (130), a first water pump (210) operatively connected to a shower tub drainage pipeline, a water path switch valve (230) fluidly connected to the first water pump (210) via a valve pipeline, a toilet storage tank (240) fluidly connected to the water path switch valve (230) via an toilet input pipeline, the outdoor water storage tank (250) fluidly connected to the water path switch valve (230) via a first outdoor input pipeline, a second water pump (220) operative connected to an output pipeline of the outdoor water storage tank (250) for moving water out of the outdoor water storage tank (250), a washing machine water storage tank (260) connected to the water path switch valve (230) via a washing machine input pipeline, a first water filter (270) fluidly connected to a washing machine drainage pipeline and the outdoor water storage tank (250) fluidly connected to the first water filter (270) via a second outdoor input pipeline, and a control switch (290) operatively connected to the water path switch valve (230).

In one embodiment, the downspout (110) has a hollow channel (112), a downspout inlet end (114) fluidly connecting a gutter to the hollow channel (112), a downspout outlet end (116) fluidly connected to an outdoor water storage tank (250), and a downspout groove (118) disposed lengthwise along an exterior surface (119) of the downspout (110). Preferably, the downspout groove (118) directly faces the exterior wall (105) such that when the electrical wiring is disposed along the downspout groove (118), the electrical wiring is concealed from view.

In some embodiments, the electrical wiring is operatively connected to at least one electrical power generator. The electrical power generator comprises a turbine (125) or solar panel. The turbine can be a wind turbine, a water turbine, or a combination thereof. In other embodiments, the turbine (125) is mounted adjacent to the downspout (110) and is structurally supported by at least the downspout brackets (120). In preferred embodiments, electrical power to the first water pump (210), the second water pump (220), the water path switch valve (230), and the control switch (290) is supplied by the electrical power generator via the electrical wiring.

In another embodiment, the conduit bracket (140) is mounted to the exterior wall (105) such that the conduit bracket (140) is disposed between the exterior wall (105) and the downspout (110). The conduit bracket (140) can support the electrical conduit (130) and the electrical wiring disposed therein. In some embodiments, the conduit bracket (140) is relatively smaller in size than the downspout bracket (120) such that the conduit bracket (140) is directly aligned with the downspout bracket (120) and the conduit bracket (140) is concealed by the downspout bracket (120).

According to one embodiment, the first water pump (210) moves grey water from a shower tub drainage pipeline to the water path switch valve (230). The control switch (290) directs the water path switch valve (230) to divert the grey water to the toilet storage tank (240), the outdoor water storage tank (250), or the washing machine water tank (260). When the grey water is diverted to the washing machine water tank (260) and after use of the grey water by a washing machine, the grey water is filtered by the first water filter (270) prior to being sent to the outdoor water storage tank (250) via the second outdoor input pipeline.

In other embodiments, the control switch (290) is wireless to wirelessly control the water path switch valve. The control switch (290) may further at least one gauge for measuring a tank level of any of the storage tanks.

In some embodiments, the outdoor water storage tank (250) has an overflow line for releasing excess water from the outdoor water storage tank (250). The release of excess water may be controlled by a float that can determine the level of the water in the outdoor water storage tank. In other embodiments, the second water pump (220) can pump water from the outdoor water storage tank (250) and through a second water filter (280) prior to use.

FIG. 1 shows a home installed with the downspout system. Power can be safely back-fed into the electrical 110V circuitry. Embedded and hidden at the back of the downspout is an electrical transport system that transports/back-feeds generated electricity from wind and water turbines. The downspout system also transports rainwater to the outdoor water storage tank. The system also provides power to an outlet and pump of the outdoor water storage tank and outside security light. The electrical transport system is tied to a ceiling light (Donut) in the home. The collected rainwater can be pressurized for watering lawns and gardens. The electrical downspout harness supplies structural support for the wire harness, as well as to the downspout to support additional weight of the wind and water turbines. A structural support block or base supports the weight of the downspout from the ground.

Figure 2:
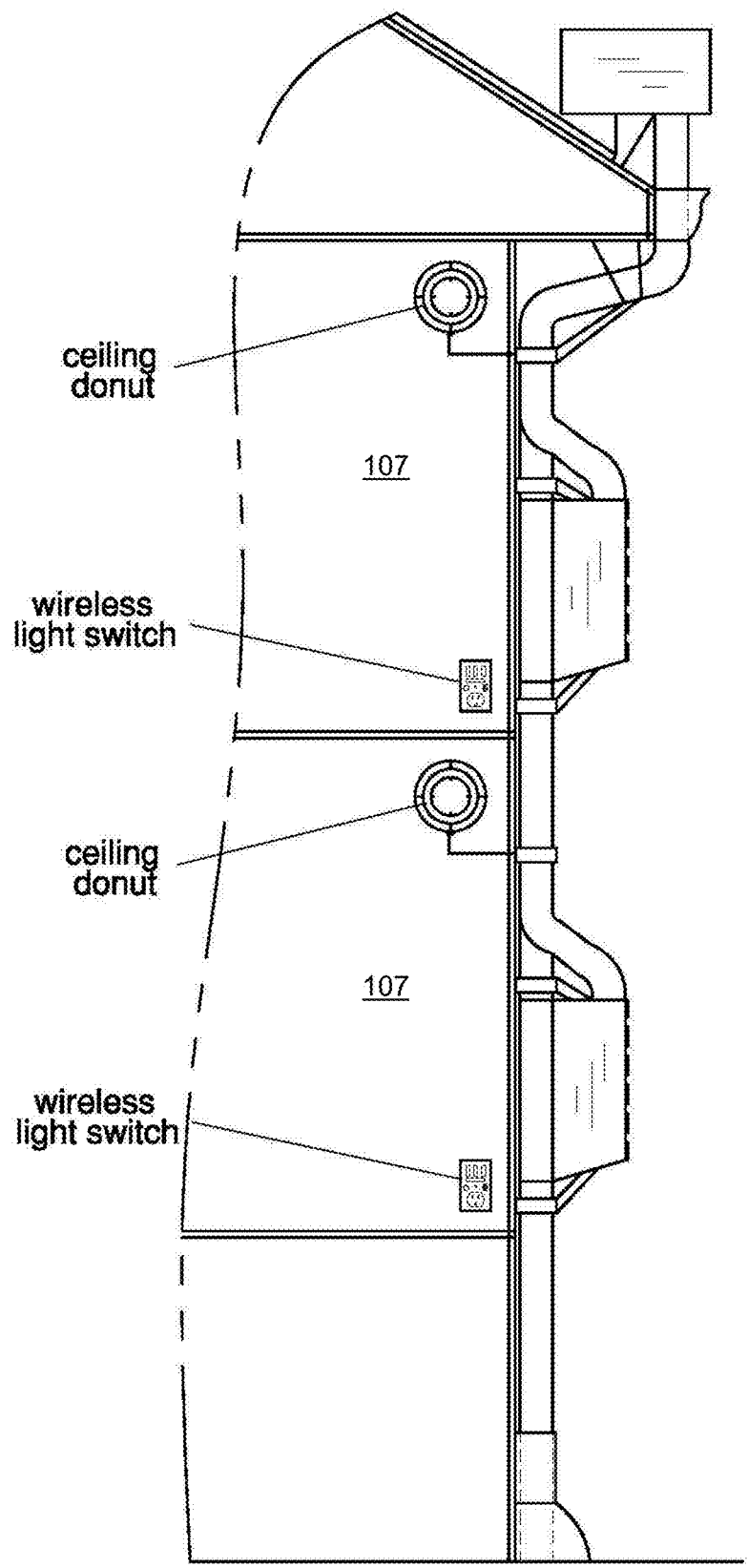
FIG. 2 shows wireless light switches and ceiling donuts in use with the downspout system.

FIG. 2 shows the "wireless light switch" and the "ceiling donut". Additional details of the wireless light switch may be found in U.S. Pat. No. 8,760,874, and additional details of the ceiling donut are described in U.S. Pat. No. 8,089,769 and U.S. Pat. No. 8,742,938, which are incorporated herein by reference. The wireless light switch provides constant overhead power to the ceiling light. The light now being turned on and off wirelessly. Thus, it can become a constant power source for the water pump in the outdoor water storage tank. At the same time, a transport medium to back-feed generated electricity into a home's power system. The Donut has three compartments that make the electrical back-feed system safe: an emergency shutoff switch, a DC to AC conversion device, and a voltage regulator that senses if too many amps are being generated/passed onto the circuit. In such situations, it regulates how much generated power is back-fed.

Figure 3:
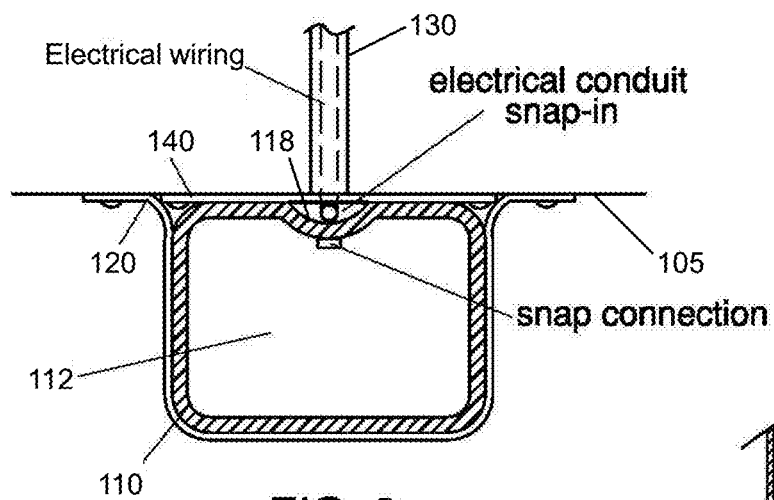
FIG. 3 shows an electrical conduit of the downspout system hidden through a house wall.

FIG. 3 shows an electrical conduit passing power out of a downspouts' hidden power harness through a house wall. The hole drilled through the wall comes out about a ½ inch above the ceiling sheetrock or just below the sheetrock. When above the sheetrock, it is snaked through to the Donut, with the sheetrock scars mudded over and painted to fix cosmetics. When just below the sheetrock, the wire is hidden in a molding, a track light, or a light on a chain hung where the power comes in from the downspout. The chain having electrical power is embedded in it and attached to the Donut.

FIG. 3 also shows the two bracket mounting system. The wire harness system is installed first, in place of the old gutters. The downspout is installed/snapped in place, on top of the wire harness, totally concealing it. The conduit mounting brackets are smaller. The downspout brackets are larger and installed over the conduit brackets to completely conceal the conduit brackets. Thus, when complete, the downspout system is stronger and capable of supporting the additional weight of wind and water turbines. A male to female snap connection joint adds structural support. The turbines may be lightweight, and depending on a window placement in a home, the turbines can be installed to the left, right, or directly on/in the middle of the downspout.

Figure 4:
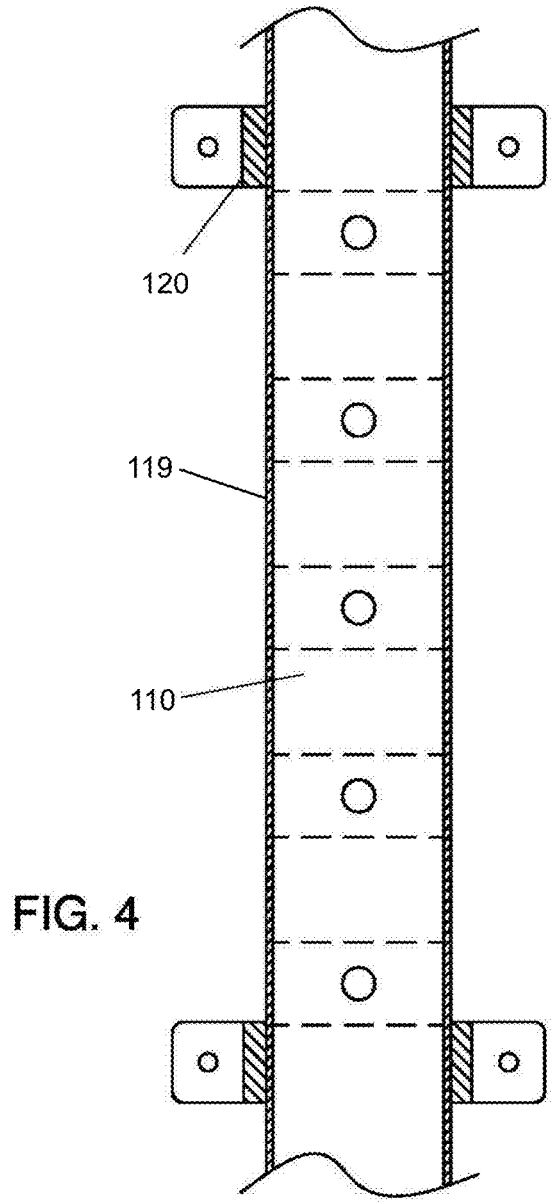
FIG. 4 shows a back view of the downspout.

FIG. 4 shows the backside of the gutter. When the downspout is installed, it is pushed into place by joining the male/female snap joints. Not shown in the figures is the male and female sides of the connection have locking ridge, which provides additional resistance/structural support to downward slipping of the joint between the wire harness and downspout.

Figure 5:
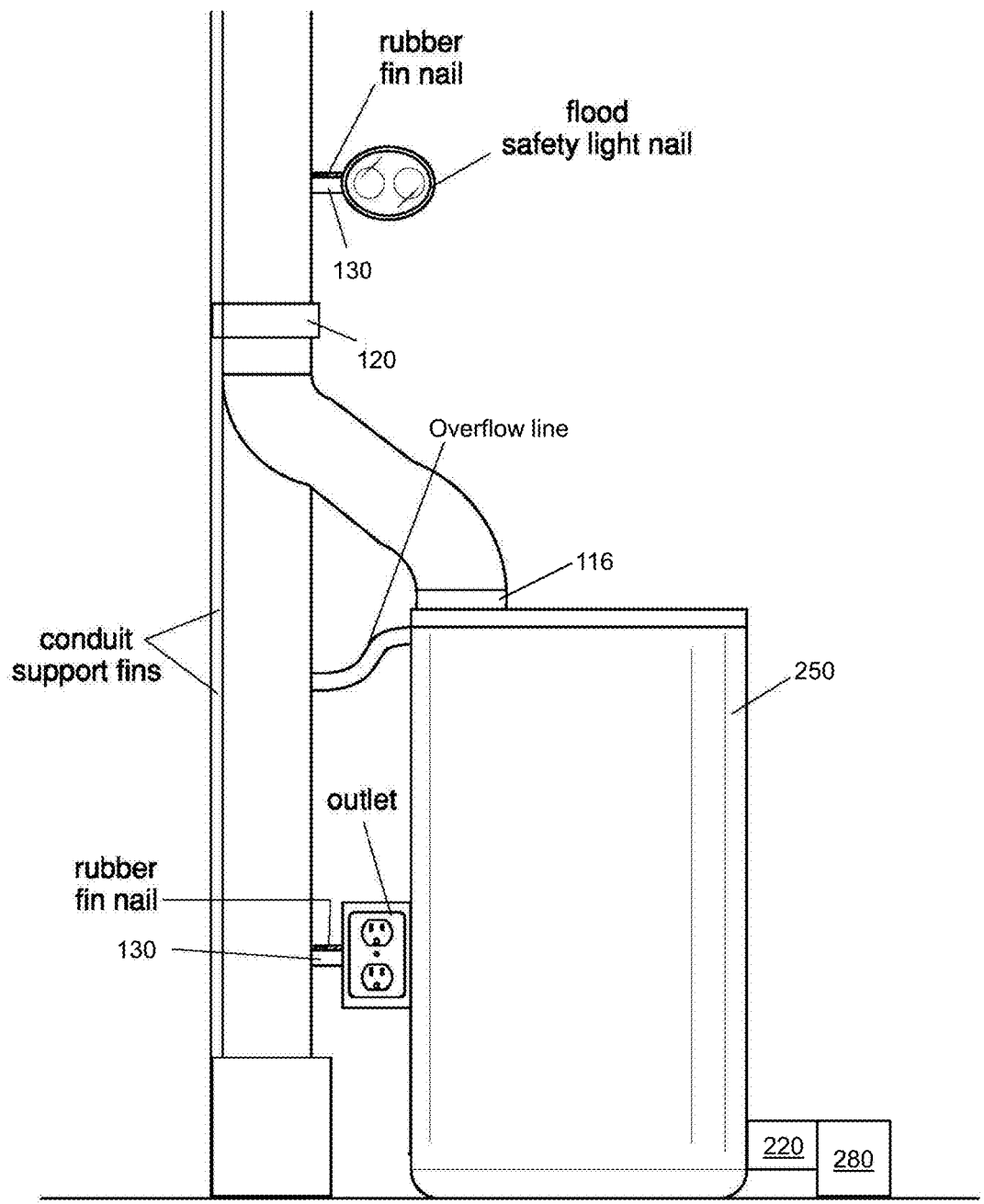
FIG. 5 shows a safety flood light and a power outlet in use with the downspout system.

FIG. 5 shows a safety flood light that may be turned on and off wirelessly, by daylight, or motion. The power outlet may be used for powering for electrical devices, such as power tools. In some embodiments, the downspout come into the center of the outdoor water storage tank; and in other embodiments, on the left side.

A rubber fin nail is an attached piece of the conduit running between the downspout and the power outlet. The siding bottom is loosened with the rubber fin pushed up underneath it and nails added. Where preexisting nails exist, it can be trimmed. The end result is a cosmetically attractive conduit securely attached to the house.

The purpose of the present invention is to reduce water consumption and generate electricity. The following figures show how a bathroom wireless light switch controls a pump that diverts grey water from a shower trap drain and allows a person who is taking a shower to divert shower grey water to three separate grey water tanks: the toilet storage tank, the washing machine storage tank, and the outdoor water storage tank, by activating one of three switches on the wireless light switch.

Figure 6:
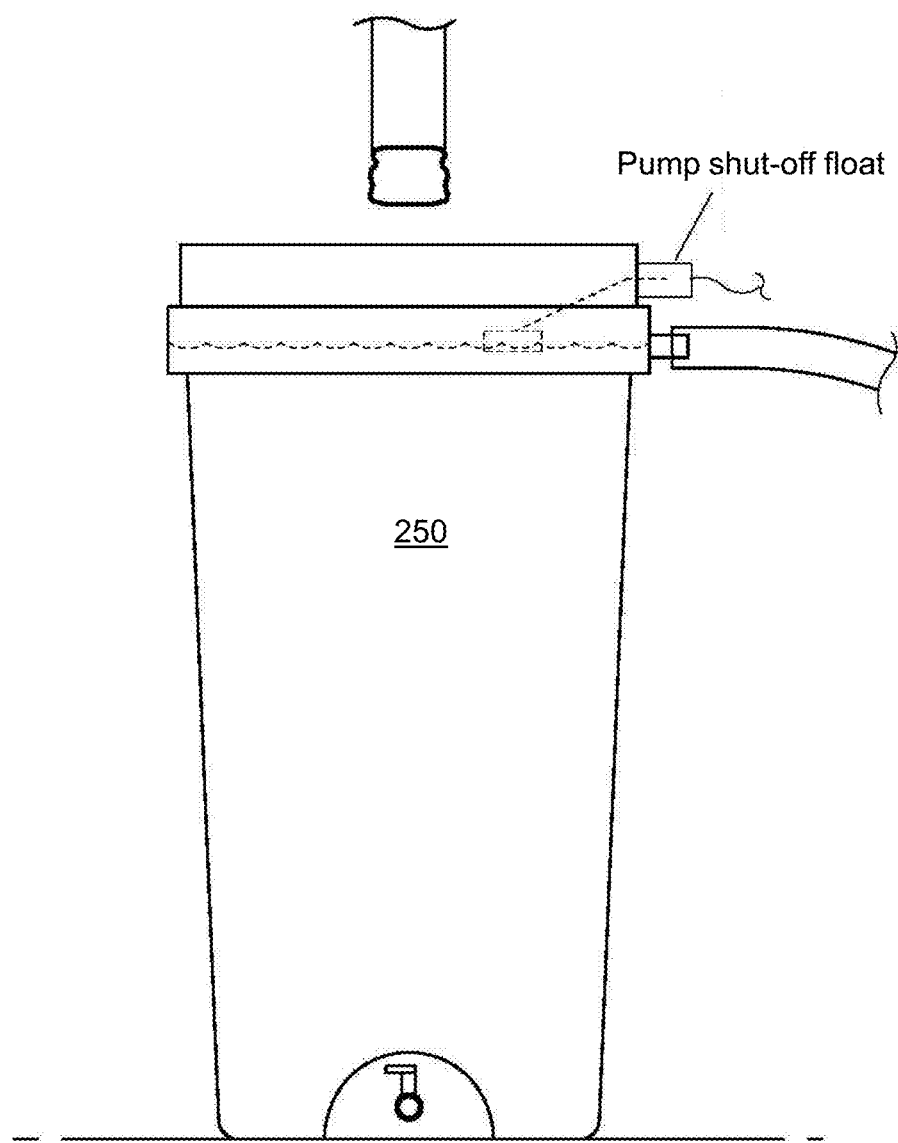
FIG. 6 shows an outdoor water storage tank according to an embodiment of the present invention.

FIG. 6 shows the outdoor water storage tank. The outdoor water storage tank is the last stop in the system. Incoming water arrives from three sources: rainwater from the downspout, grey water from the shower trap pump, and triple-use grey water from the washing machine. The top of the outdoor water storage tank has incoming rainwater from the downspout. On the backside, it shows two other intake hoses: one from the washing machine and a second from the shower trap pump. The outdoor water storage tank may have a "full barrel shut off float". Some homes might prefer the overflow going to the yard instead of the pump being shut down. However, in winter weather and in areas of high precipitation, it is preferable that the pump is shut down.

Figure 7:
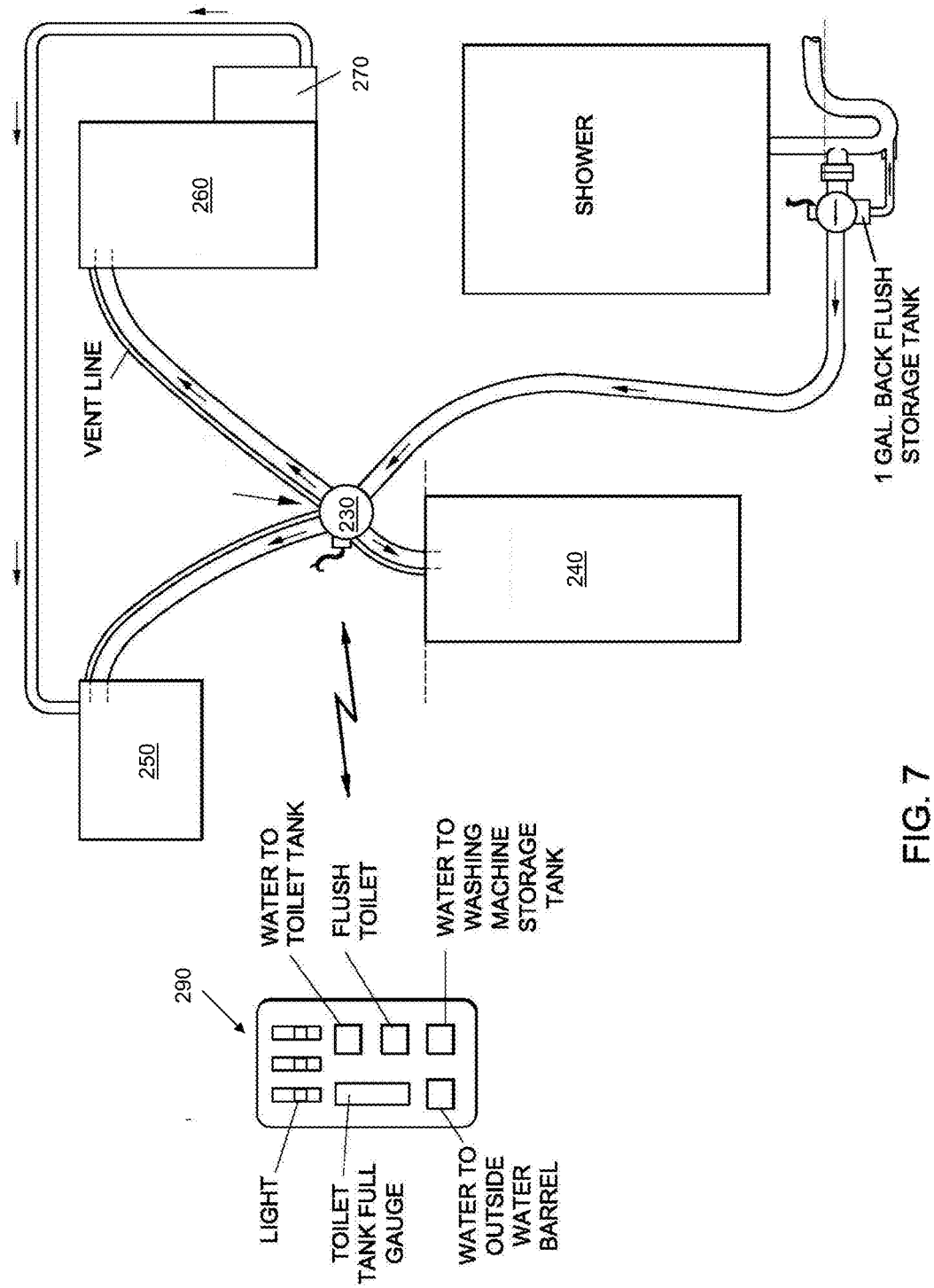
FIG. 7 shows a schematic of a water collection system according to an embodiment of the present invention.

The core of FIG. 7 is the Donut wireless switch. The switch, working with the gauge, allows a person to choose where the shower grey water goes prior to taking a shower: to the outdoor water storage tank, toilet storage tank, or washing machine storage tank. The washing machine storage tank can match the exact amount of water required to wash clothes. Thus, the tank is empty after a wash, and ready to take a full load of water from the next shower.

The water pump motor may be attached to the shower trap. Initial quarts of shower water are usually the dirtiest, and over time, debris can build up in the trap. The back flush mechanism of the pump uses the first couple of quarts to flush clean the trap. This function will not occur for every shower, but can be programmed to do so. Based on time, this function may occur once a week. The vent lines can serve two purposes: vent the tanks so they can fill, and an overflow mechanism. The vent terminates into the overflow tube in the toilet tank, thus having a path for water to the sewer.

Figure 8:
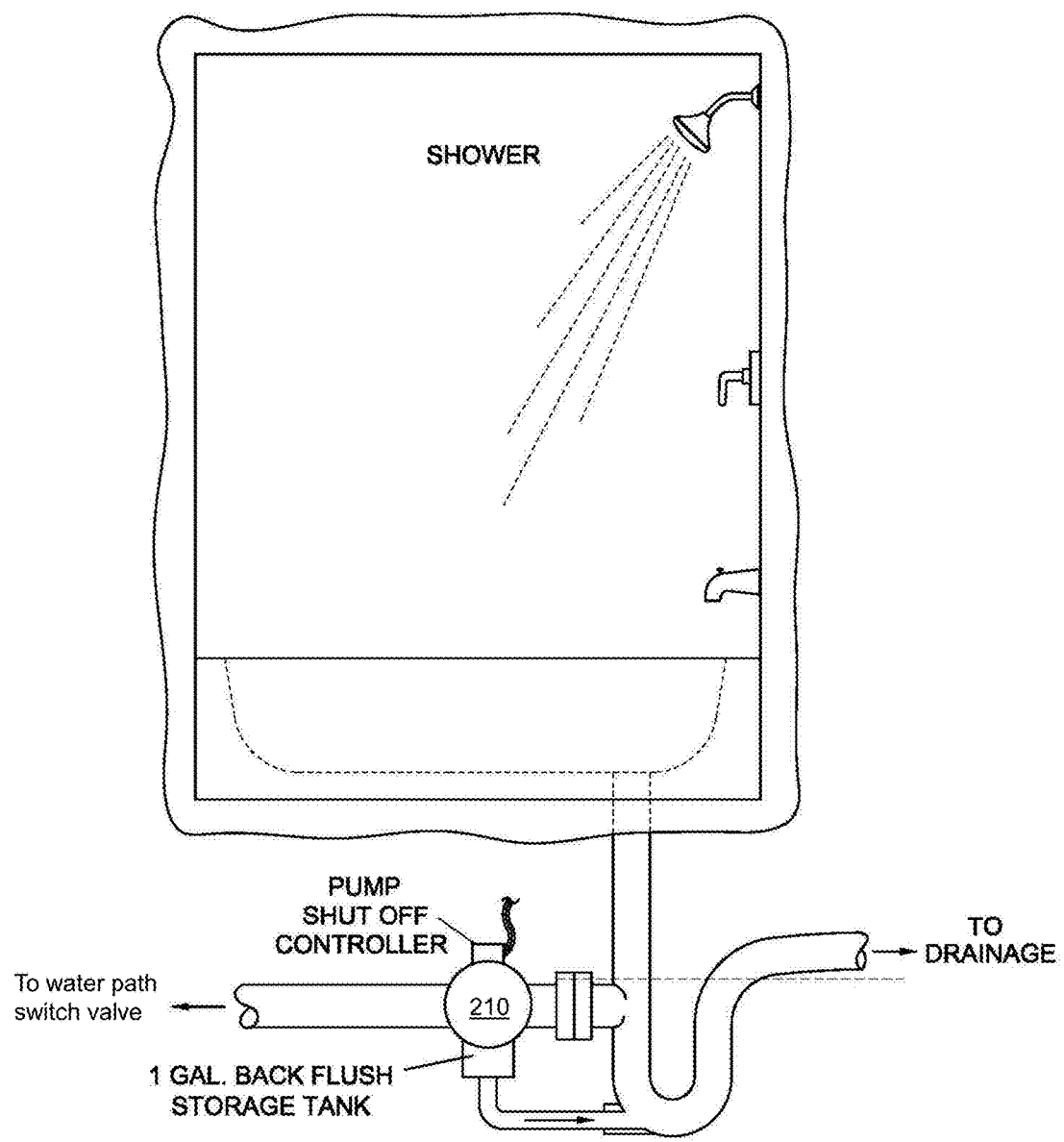
FIG. 8 shows a shower tub of the water collection system.

FIG. 8 is an extension of FIG. 7. A special drain filter that replaces the standard drain covers in tubs and showers is not shown. Its purpose is to filter out debris prior to it making its way to any grey water storage tank. The drain filter is accessible and can be cleaned regularly. A pump shut off controller is a wireless device that can be shut off via the Donut wireless switch.

Figure 9:
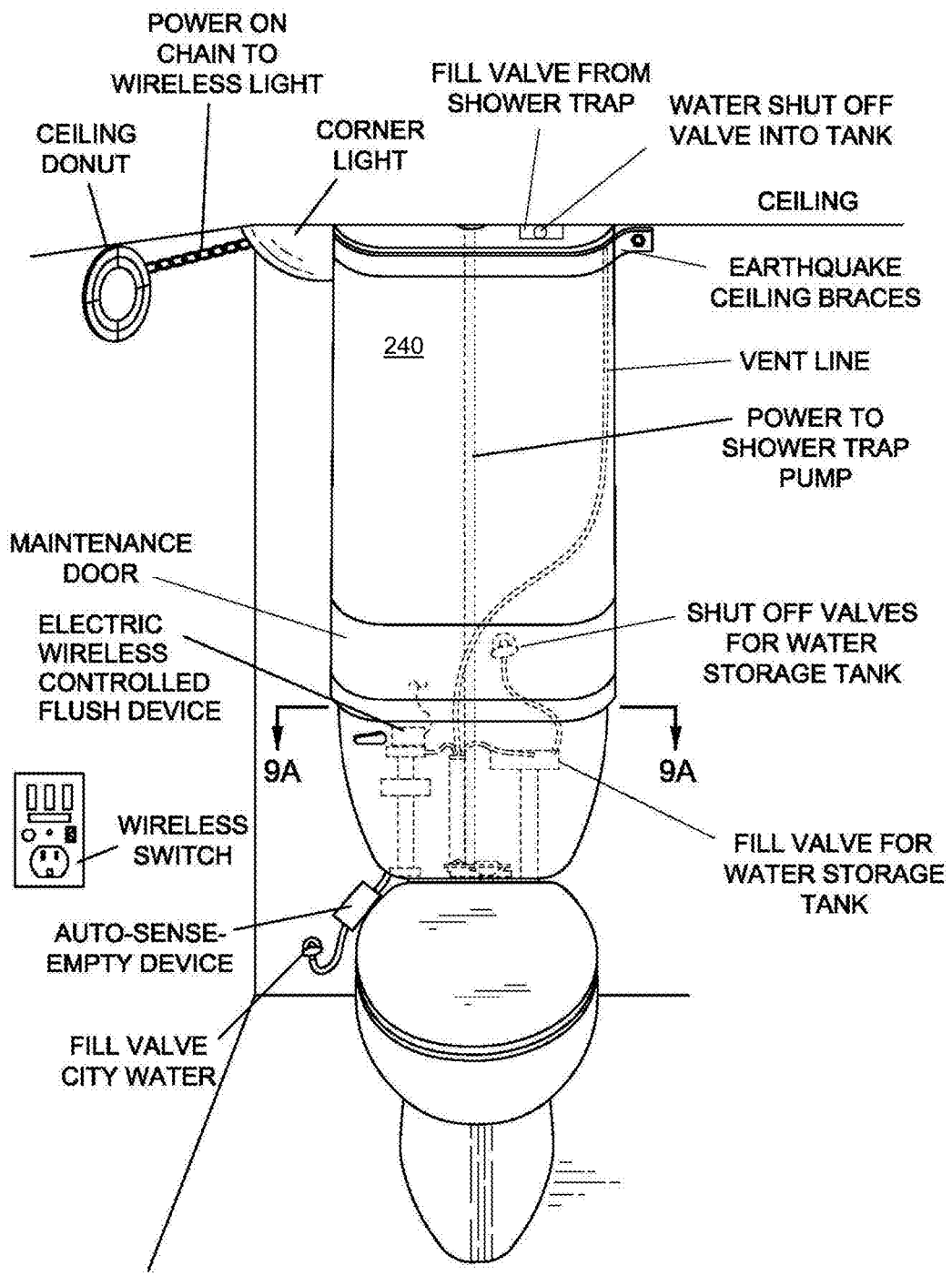
FIG. 9 shows a toilet of the water collection system.
Figure 9A:
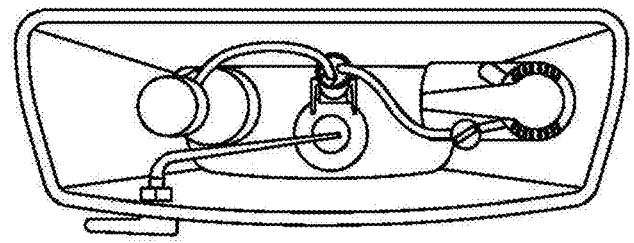
FIG. 9A shows an interior view of a toilet flush tank.
Figure 9B:
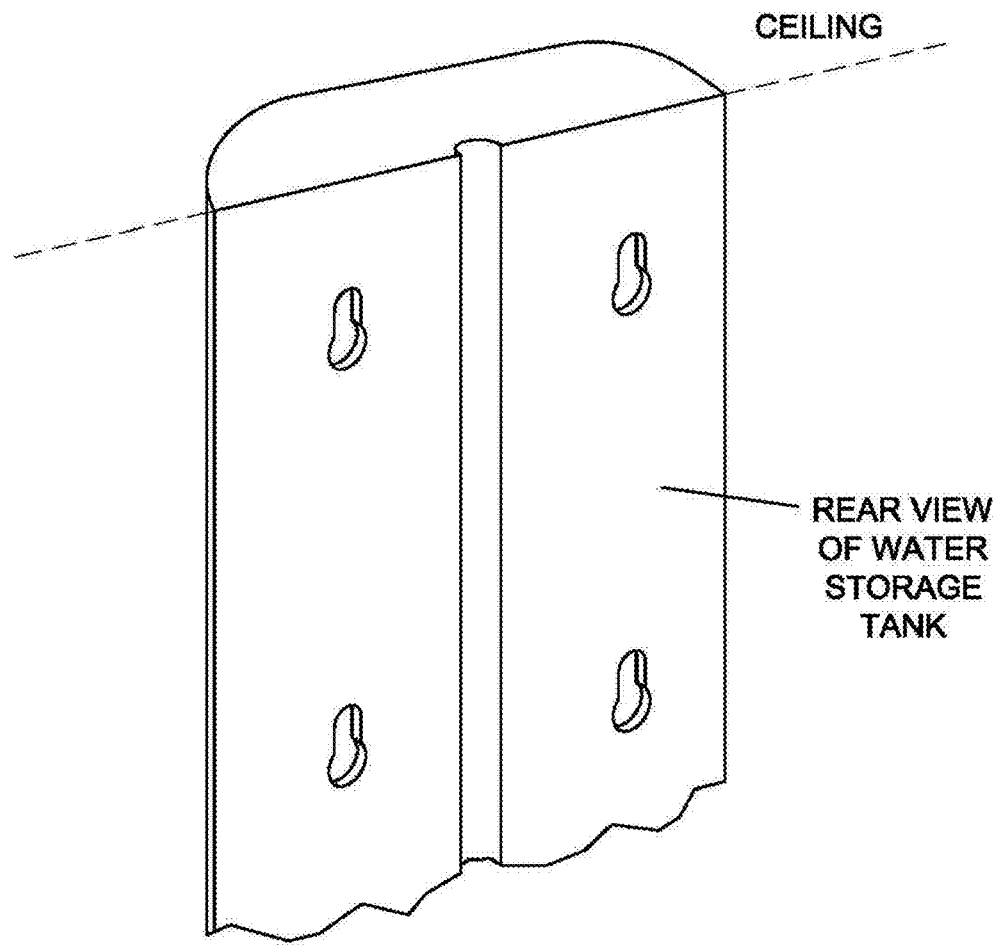
FIG. 9B shows a mount for a toilet storage tank.

FIGS. 9, 9A and 9B show a toilet that has an approximate 60 gallon water storage capability. In the back of the tank are female lock joints. Before the tank is installed, a mounting bracket is attached to the wall, for example, by 2×4 studs. The mounting brackets has male lock joints, thus when the tank is installed, it is locked firmly to the wall. After the toilet is installed, the maintenance section of the toilet is cut to fit. The end result is the heavy water storage tank locked securely to the ceiling and its weight supported from both below and by the wall. The last part of the installation is to install the earthquake trim molding, thus keeping the tank from tipping forward or sideways during an earthquake. The storage tank has shut-off valves where the water enters the tank, and another behind the maintenance snap-out door needed for tank maintenance. The fill valve for the toilet tank is concealed in the top rear cavern that allows it to be hidden, and the toilet tank to sit flush with the wall.

At times, there will be no grey water to flush the toilet. Thus, an auto-sense-empty device is installed. If the water storage tank is empty, the device turns on city water. Not shown in the drawings is a water fill gauge that reports to the wireless light switch. A person who is about to take a shower is given the means to tell if the toilet storage tank needs water. The toilet flush tank can have two fill devices, one for city water, and one for grey water, which is needed to prevent grey water back-flow into city water.

Power is supplied to the toilet via an overhead Donut. Power goes from the Donut to a corner light next to the toilet, and from there, to the toilet back side conduit. In standard one story homes having a roof crawl space, this is not needed. Power can be supplied using the path: Donut power box to crawl space, and back down to the toilet through ceiling to the toilet power conduit. Once power is at the back of the toilet, it passes through a conduit down through a groove in the back of the toilet tank, maintenance section, toilet base, through the floor, to the trap water pump in the crawl space below. The power coming down from the ceiling is totally concealed by a built-in conduit in the toilet.

Figure 10:
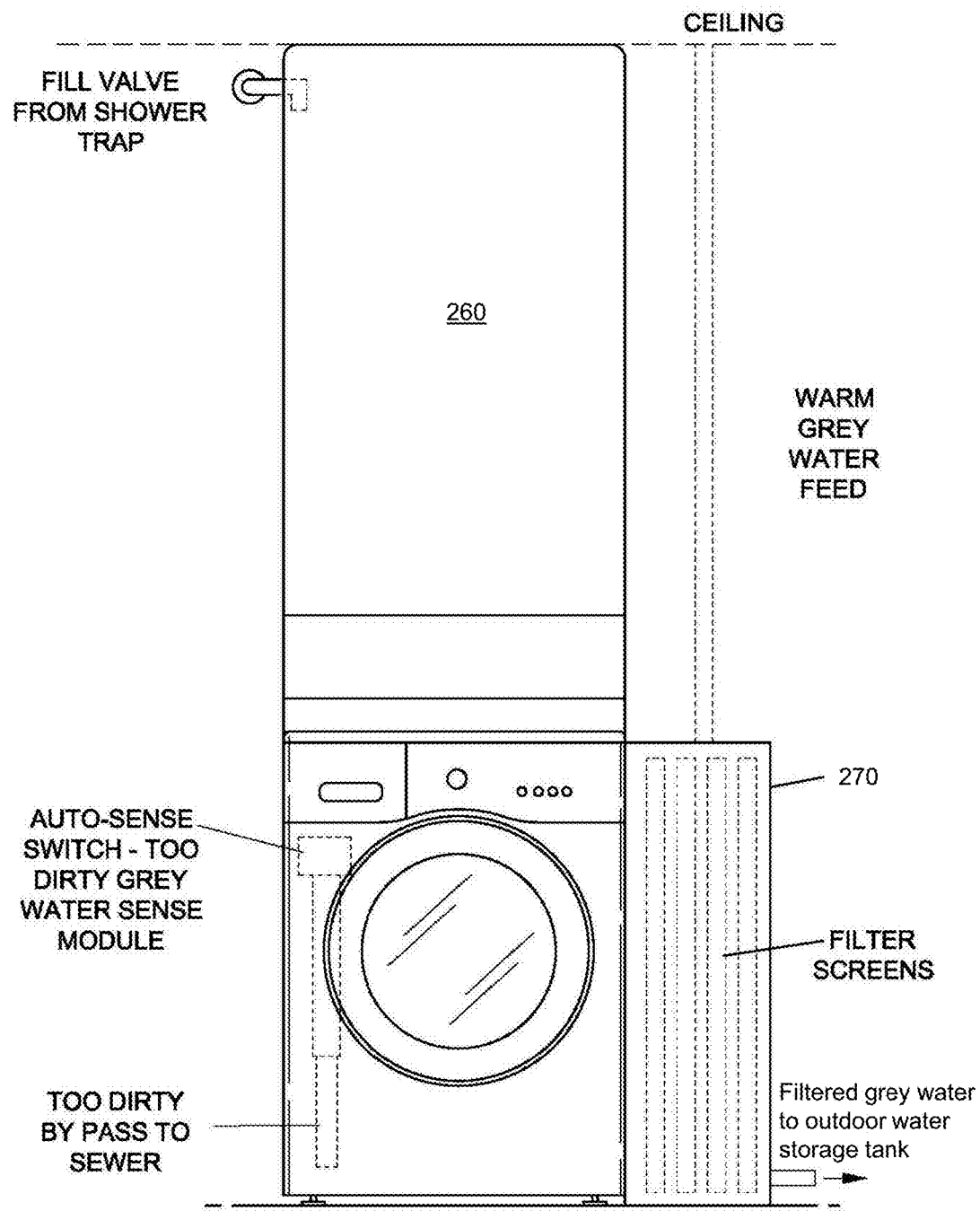
FIG. 10 shows a washing machine of the water collection system.
Figure 11:
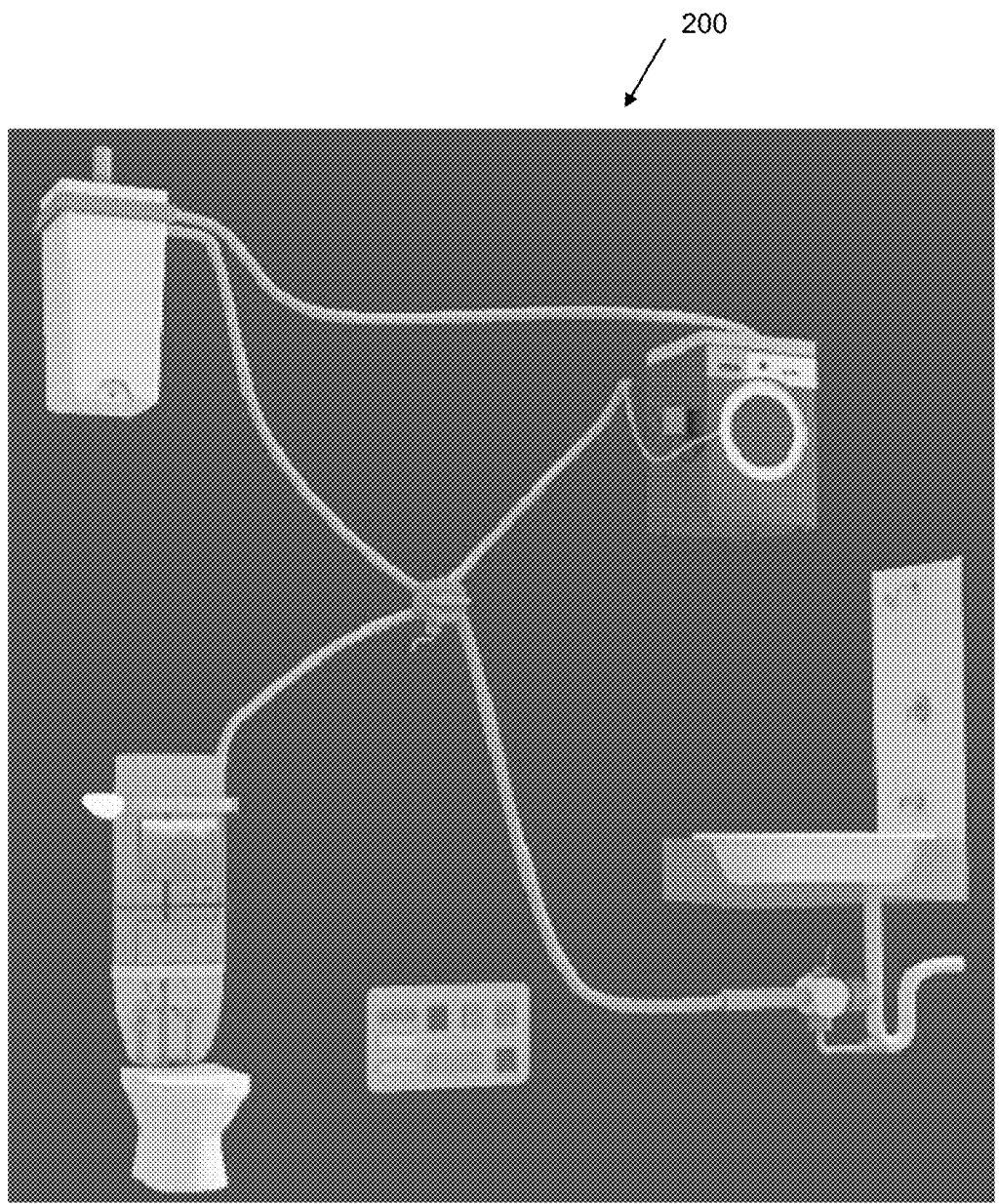
FIG. 11 shows a schematic of the water collection system according to an embodiment of the present invention.
Figure 12:
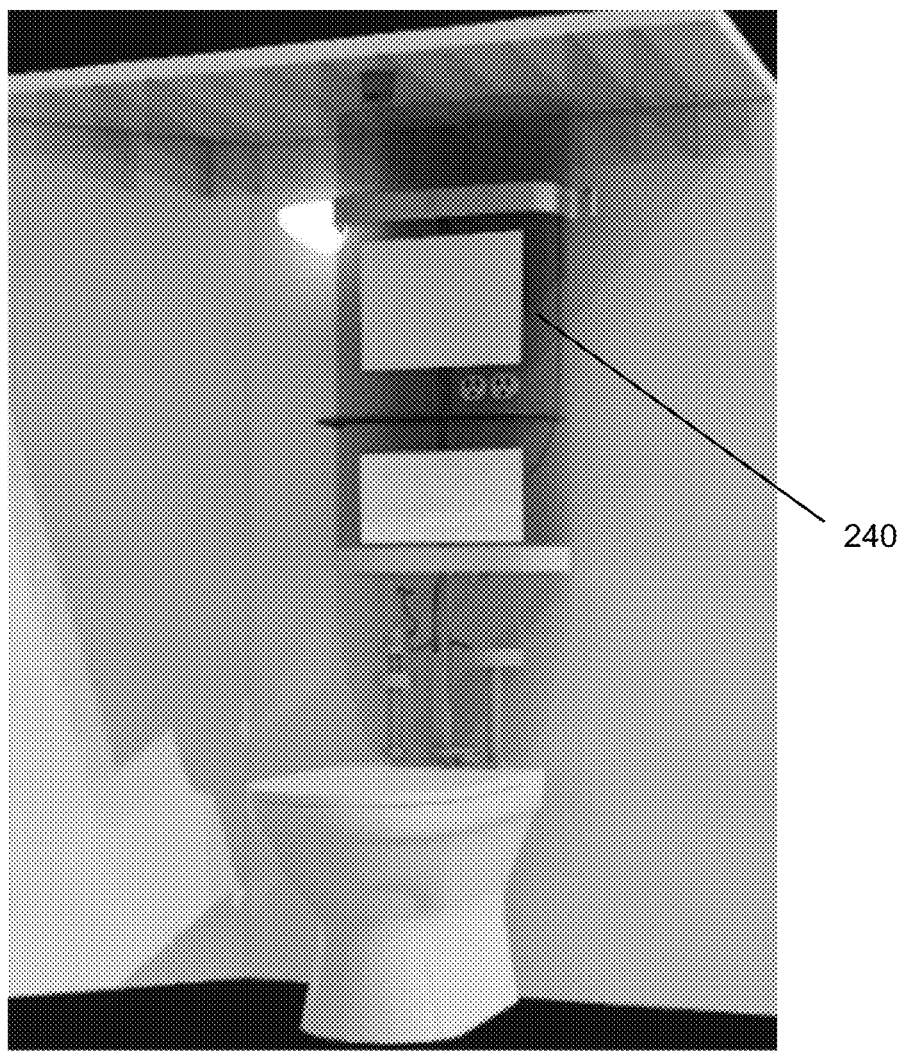
FIG. 12 shows a schematic of the toilet of the water collection system.
Figure 13:
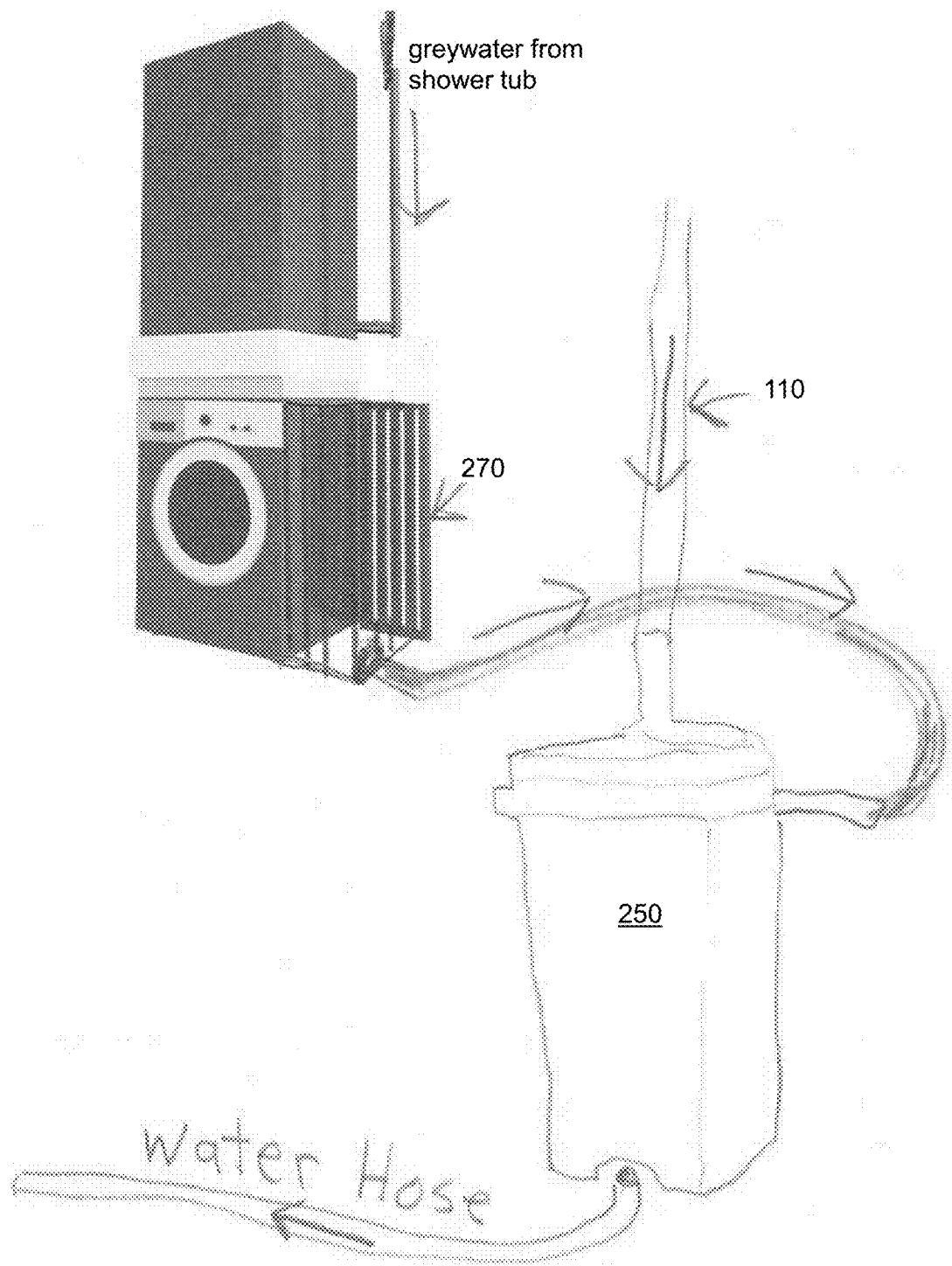
FIG. 13 shows a schematic of the washing machine and outdoor water storage tank of the water collection system.
Figure 15:
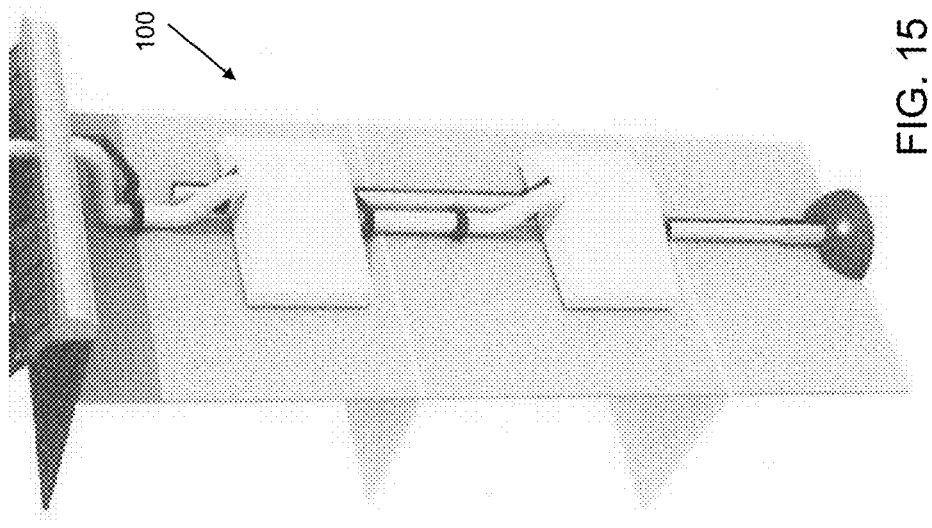
FIG. 15 shows an embodiment of the downspout system.
Figure 14:
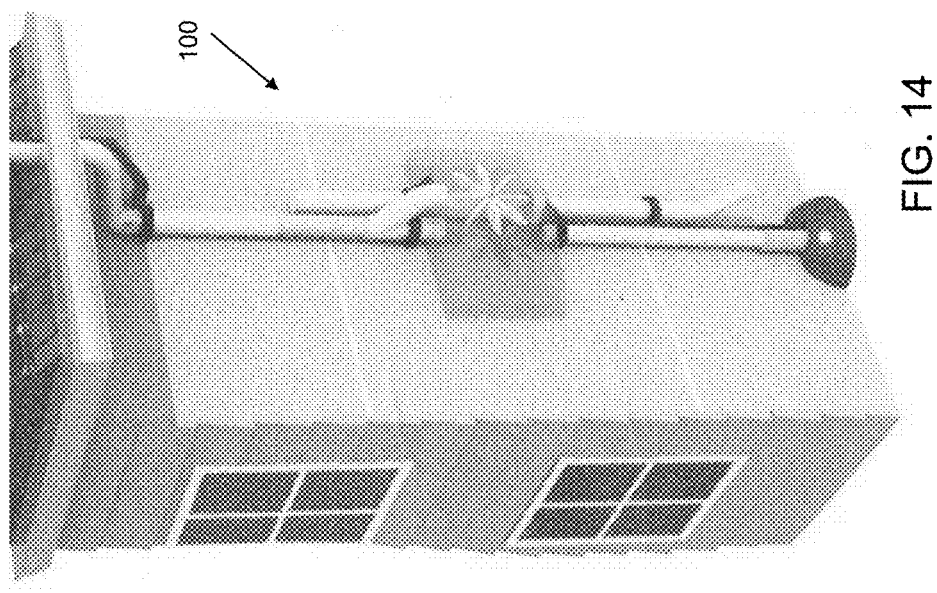
FIG. 14 shows an embodiment of the downspout system.
Figure 16:
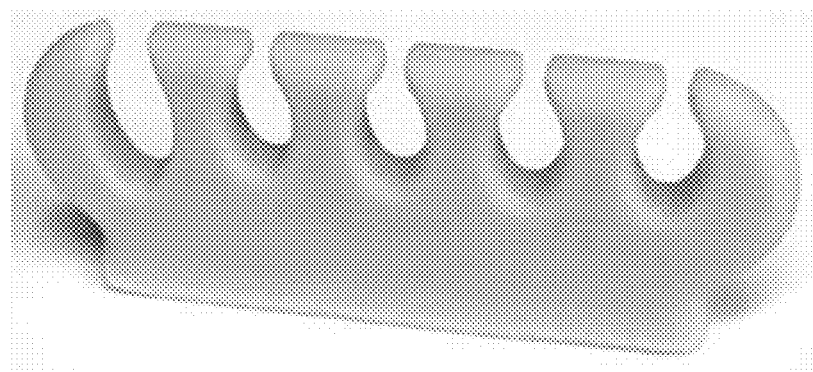
FIG. 16 shows an embodiment of a cable hanger of the present invention.
Figure 17:
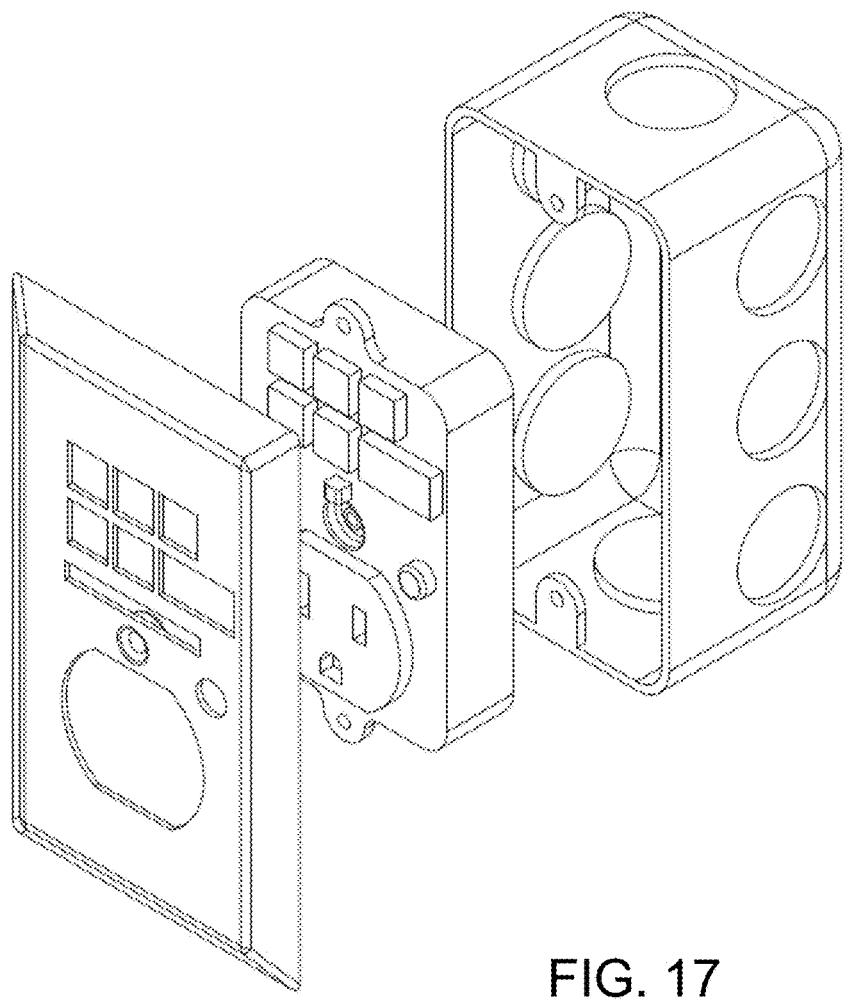
FIG. 17 shows an embodiment of an electrical box of the present invention.
Figure 18:
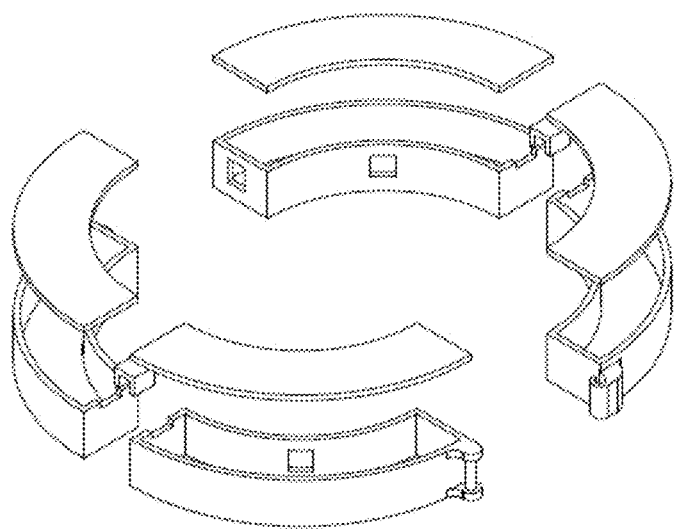
FIG. 18 shows an embodiment of the ceiling donut of the present invention.
Figure 19:
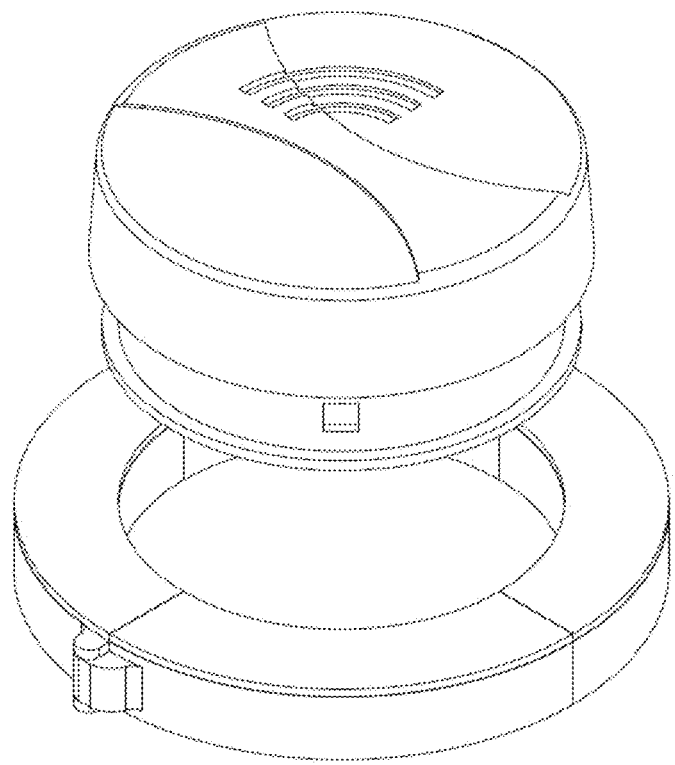
FIG. 19 shows an embodiment of the ceiling donut and a smoke alarm of the present invention.

FIG. 10 shows a washing machine having three water intakes: city water, hot and cold, and warm grey water feed from the shower trap pump. The storage tank is the exact size to wash a full load of cloths. Thus, when a wash is completed, the storage tank is empty and clothes are washed with hot shower water. The amount of water used to wash clothes and take a shower are about the same, so there is free water and free energy to wash clothes in hot water. The washing machine has an auto-sense module that detects when grey water is too dirty, thereby sending the dirty gray water to the outdoor water storage tank for lawn watering. It also has a manual option to dump used grey wash water to the sewer, for example, when washing baby diapers.

On the side of the washing machine is a grey water filter system. The filters are designed to be washed clean. Suitable water from the grey water filter is pumped to the outdoor water storage tank, taking the path up through the roof crawl space, across to the outdoor water storage tank and through the wall to hit a tank intake valve, all of which are hidden except the water line going up the wall from the grey water filter. However, most of the water line may be hidden behind the washing machine and storage tank.

In some embodiments, the downspout generates electricity, while spinning away large debris as it diverts the water afterward for re-use.

The following is a non-limiting example of utilizing the system in a home. The high gutter spot on a house is about 25 feet up. The downspout may be tied back into an angle joint near the bathroom water tank fill valve. In some embodiments, the size of the downspouts is increased for holding more water. At the water tank joint is the release valve that releases the water in the tank after it gets to a certain weight. The water then flows or drops about 10 feet and hits the water turbine. In some embodiments, the force on the water turbine is a weight of about 300 pounds, or about 40 gallons of water. The sudden hit of water pressure will simulate self-cleaning as it will keep clean the debris, such as leaves.

The following is a non-limiting example of utilizing the present invention. In a standard single story home, several persons are about to take a shower, one followed by washing their clothes, the other watering flowers in the garden. A person's shower routine may be as follows: upon walking into the bathroom, the first person hits the button on the Donut light switch that instructs that the shower water to be diverted to the storage tank just above the washing machine in another section of the home. When the button is pushed, it activates a wireless by-pass switch on the very top of the toilet tank/crawlspace, so the very warm shower water is moved directly to the empty tank above the washing machine. The washing machine is only hooked to cold city water, hot being warm shower water. Immediately after taking the shower, clothes are washed while water is still hot.

A second person of the family is about to take a shower, but prior to doing so, he/she hits the button to transfer water to the outdoor water storage tank. Checking the toilet tank gauge, it has plenty of water for flushing, and he/she wants to use the 40 gallons of water from the shower to water the flowers and grass in the garden.

The water comes from the trap, is then concealed behind the toilet, hits the by-pass switch, up into the crawl space, and travels about 20 feet to the washing machine or outdoor water storage tank. The small 30-gallon tank fits through the very small crawlspace access door. In addition, the small tank is suitable for storing water to have clothes washed with very warm water. This system uses less energy and water than conventional washing of clothes.

When the washing machine tank is full, the water patch switch valve can by-pass it to fill up the toilet tank. When the toilet tank gets full, it by-passes to fill up the outdoor water storage tank. The outdoor water storage tank is tucked up under a downspout and the waterline to fill it comes from the crawlspace that is hidden, along with electrical to power the Donut coming from the bathroom to the outdoor water storage tank pump.

In some embodiments, the electrical box and Donut work together to provide power to a toilet, allowing it to re-use shower water to flush the toilet and wash clothes, thereby reducing water usage in half for some homes. In other embodiments, the electrical box and Donut work together to power a ceiling electric heater, allowing forced air furnaces to be turned off at night. In some embodiments, the electrical box works with the wind turbine based heater vent to close vents automatically during periods/times when homes are not occupied.

In some embodiments, the Donut and electrical box provide a safe back-feed medium for solar panels and wind-turbines, thus greatly influencing wider adoption in homes. The Donut and electrical box switch allows for security cameras to be installed on porch lights. The Donut and electrical box switch allow for baby monitoring cameras to be installed on bedroom lights. The Donut and electrical box switch allow for additional power outlets to be installed on outside porches. The Donut and the electrical box have wireless capabilities, along with providing power, allowing for curtains to be auto shut based on time, and thus conserving energy.

The Donut may have many modules for different devices. The Donut may have a smoke alarm installed that has 110 power, but not battery driven. The Donut may have a wireless access/4G receiver, allowing all aspects of homes to be controlled remotely. Advances in Ethernet over electrical home wiring allow wireless access points to be installed on numerous lights throughout a home, thereby providing superior wireless coverage than what exists today.

The Donut may be modified to become a wireless speaker system for a home installed in all room lights. The Donut may be tied to the doorbell system. Porch lights may be turned on remotely via cell phones with the Donut and electrical boxes installed. The Donut and wireless electrical box may be an emergency lighting system. Donut lights having large rechargeable batteries installed in some modules can power DC lights. Lights may become signal boosters for cell phones, thus eliminating the need for land lines.

In further embodiments, the toilet storage tank goes up to the ceiling. A small section of sheetrock is cut out above the tank and the wireless water path switch valve is installed between adjacent 2×10 ceiling joists. Power is supplied to the path switch valve from a bathroom ceiling light.

In other embodiments, electrical power may be taken from the bathroom ceiling light installed from the hole cut in the sheetrock. Electrical power may be hidden in the back of the toilet in a conduit, down to the water pump vacuum device installed on the shower water trap. The bathroom light can be controlled wirelessly so constant power is provided to the shower trap pump, path switch valve, and the power outlet built into the toilet. Water from the shower trap comes up to the path switch valve in another built-in water line in the back of the toilet. The bathroom light switch is replaced with a wireless switch that controls the wireless water path switch valve as well as the ceiling light, thereby allowing the water path to be chosen just prior to a person taking a shower.

The present invention allows for coordination of taking showers with washing clothes, thus allowing clothes to be washed with hot shower water. The water line to the washing machine may be hidden between the joists or roof crawl space above. When not washing clothes, the default is to fill the toilet storage tank. When it is full, it automatically switches and transfers water to the outdoor water storage tank. The water line to the outdoor water storage tank is hidden between the ceiling joists. The water line has a conduit attached to it where power goes out to the outdoor water storage tank, thus allowing pressured water for watering the grass and garden. The only water that goes down to the sewer is from the toilet. The washing machine takes water from the shower. The washing machine sends its water after filtering outside to water the lawn, thereby reducing wildfire risks and allowing for triple use of water.

An overhead light of the toilet can have a Donut device attached. From it, a power line goes outside to a wind turbine that is installed to the downspout and gutters. Power is back-charged into the home power system. Roof solar panels can be connected to the downspout system.

In some embodiments, the water path switch valve is added on top of the toilet. When the toilet is installed, the sheetrock is cut out just above the toilet. In this space between the ceiling joists, the water patch switch valve is installed and hidden. The water path switch valve hole above the toilet is also a maintenance/construction door. From it, water lines to the outside of the house, the washing machine, and shower can be installed. After installation of the toilet, the maintenance/construction door is hidden by the toilet tank and trim push flush to the ceiling. When installation is completed, the newly remodeled bathroom shows almost no after effects.

In other embodiments, the water pump of the shower trap may be a vacuum cleaner. It can spin water and remove debris. In the tub/shower drain is a fill tube to fill the pump disinfecting tank. The back-flush is the way the pump empties the vacuum bag. The bag being a one gallon holding tank below the pump.

According to another embodiment, the present invention features a shower dispenser that can control water flow by eye blinks. Water is wasted during showers when a person is shaving, washing hair, soaping up, etc. Reducing water flow during these times is inconvenient to do so using one's hands, and is generally not done. Humans have two eyes and blinking is a normal process. For example, using both face and voice recognition built into the shower head, blinking the left eye can reduce the water flow rate, and blinking it 4 times stops water flow. Blinking of the right eye can reverse the flow rate, for instance, one blink increase water flow, and 4 blinks increase the water flow rate to its maximum.

In further embodiments, the present invention may feature a water and energy conservation system. A heater vent may be operatively connected to a wireless light switch, turning the turbine-based heater vent on and off. The heater vent is able to charge its battery using wind from the furnace. The overhead light now has constant power and is able to learn occupancy using a motion detection device. The light will sense darkness and motion in the room, and when in auto mode, it will shut heater vents off based on occupancy. Individuals can also manually set times when heater vents should be shut or opened.

The wireless light switch works with the water path switch valve mounted above the toilet, allowing individuals to choose how they reuse their shower water. The various switches on this wireless light switch offer choices (working with the water path switch valve) on which path the used shower water should take, directing it to the toilet, a washing machine or to a garden. The wireless bathroom light switch has a toggle button that can send shower water directly to the washing machine. The used shower water is hot and ready to wash clothes, not requiring additional water to be heated. A person could wash their personal clothes while taking a shower by simply sending used hot water to the washing machine.

When an individual chooses to send water outside, it enters a permaculture system where the water is exposed to ultraviolet light to kill any bacteria before moving on to a vegetable garden. Alternative, the water may be sent to a growing box, in which the water enters from the bottom, and the decomposition combustion pulls it up to the surface. This process cleanses the water making it clean, and safe to grow food.

The light switch toggles include a choice to send the water to a toilet. The toilet can hide the electrical system to the pump on the shower trap and water up to the path switch device and back to the toilet There is a holding tank for the toilet containing an ultraviolet light along with a disinfectant bowl cleaner. The path switch valve is just above the toilet. An access hole can be cut in the sheetrock just above the toilet allowing water and power to be sent outside between ceiling joists. When the toilet is installed, it hides the cut/hole in the sheetrock and allows the system to be installed fast and inexpensively without remodeling bathrooms. From the access hole, power is pulled from the ceiling light, which now has constant power. The ceiling light is now being turned on/off wirelessly.

The floor-to-ceiling toilet allows a very clean way to get power outside to wind turbines installed on the outside structural gutters. However, power can be sent outside to allow back charging from any light, in any room. A 12 inch oval or half oval hole is cut out of the sheetrock. The top layer light ring attachment is a 14 inch oval that when installed covers the 12 inch hole, so no sheetrock repair is needed.

Currently, smoke alarms are rarely tested due to their location and the inconvenience of requiring a ladder for access. With current smoke alarms, once the battery dies they are seldom quickly replaced, or never replaced, due to lack of a readily available replacement battery. In some rooms, the overhead light can now contain a smoke alarm with constant power. The light switch has an easily accessible smoke alarm test button. The smoke alarm can have multiple purposes, such as a wireless router, motion detector, and security cameras. The transport can be Ethernet over the electrical system.

As used herein, the term "about" refers to plus or minus 10% of the referenced number.

The disclosures of the following U.S. Patents are incorporated in their entirety by reference herein: U.S. Pat. No. 8,089,769, U.S. Pat. No. 8,742,938, U.S. Pat. No. 8,760,874, U.S. Pat. No. 8,979,622, and US Publication No. 2011/0053487.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A water collection and recycling system comprising:
   a. a downspout (110) vertically disposed on an exterior wall (105) of a building (10), the downspout (110) having a hollow channel (112), a downspout inlet end (114) fluidly connecting a gutter to the hollow channel (112), a downspout outlet end (116) fluidly connected to an outdoor water storage tank (250), and a downspout groove (118) disposed lengthwise along an exterior surface (119) of the downspout (110), wherein the downspout groove (118) directly faces the exterior wall (105), wherein the electrical wiring is disposed along the downspout groove (118), the electrical wiring being operatively connected to at least one electrical power generator;
   b. a plurality of downspout brackets (120) for mounting the downspout (110) to the exterior wall (105);
   c. at least one electrical conduit (130) for routing the electrical wiring through the exterior wall (105) and into an interior location (107) of the building (10);
   d. a conduit bracket (140) for each electrical conduit (130), wherein the conduit bracket (140) is mounted to the exterior wall (105) such that the conduit bracket (140) is disposed between the exterior wall (105) and the downspout (110), wherein the conduit bracket (140) supports the electrical conduit (130) and the electrical wiring disposed therein;
   e. a first water pump (210) operatively connected to a shower tub drainage pipeline;
   f. a water path switch valve (230) fluidly connected to the first water pump (210) via a valve pipeline;
   g. a toilet storage tank (240) fluidly connected to the water path switch valve (230) via an toilet input pipeline;
   h. the outdoor water storage tank (250) fluidly connected to the water path switch valve (230) via a first outdoor input pipeline;
   i. a second water pump (220) operative connected to an output pipeline of the outdoor water storage tank (250) for moving water out of the outdoor water storage tank (250);
   j. a washing machine water storage tank (260) connected to the water path switch valve (230) via a washing machine input pipeline;
   k. a first water filter (270) fluidly connected to a washing machine drainage pipeline, wherein the outdoor water storage tank (250) is fluidly connected to the first water filter (270) via a second outdoor input pipeline; and
   l. a control switch (290) operatively connected to the water path switch valve (230);
      wherein the first water pump (210) moves grey water from a shower tub drainage pipeline to the water path switch valve (230), wherein the control switch (290) directs the water path switch valve (230) to divert the grey water to the toilet storage tank (240), the outdoor water storage tank (250), or the washing machine water tank (260),
      wherein when the grey water is diverted to the washing machine water tank (260) and after use of the grey water by a washing machine, the grey water is filtered by the first water filter (270) prior to being sent to the outdoor water storage tank (250) via the second outdoor input pipeline,
      wherein electrical power to the first water pump (210), the second water pump (220), the water path switch valve (230), and the control switch (290) is supplied by the electrical power generator via the electrical wiring.

2. The system of claim 1, wherein the conduit bracket (140) is relatively smaller in size than the downspout bracket (120), wherein the conduit bracket (140) is directly aligned with the downspout bracket (120) such that conduit bracket (140) is hidden from view by the downspout bracket (120).

3. The system of claim 1, wherein the electrical power generator comprises a turbine (125), wherein the turbine is a wind turbine, a water turbine, or a combination thereof.

4. The system of claim 3, wherein the turbine (125) is mounted adjacent to the downspout (110).

5. The system of claim 4, wherein the turbine (125) is structurally supported by at least the downspout brackets (120).

6. The system of claim 1, wherein the control switch (290) is wireless.

7. The system of claim 1, wherein the control switch (290) has at least one gauge for measuring a tank level.

8. The system of claim 1, wherein the outdoor water storage tank (250) has an overflow line for releasing excess water from the outdoor water storage tank (250).

9. The system of claim 1, wherein the second water pump (220) pumps water from the outdoor water storage tank (250) and through a second water filter (280).

* * * * *